US008429018B2

(12) United States Patent
Westphal (10) Patent No.: US 8,429,018 B2
(45) Date of Patent: Apr. 23, 2013

(54) SYSTEM AND METHOD FOR DETECTING A POSSIBLE ERROR IN A CUSTOMER PROVIDED PRODUCT ORDER QUANTITY

(75) Inventor: Geoffry A. Westphal, Park Ridge, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 1080 days.

(21) Appl. No.: 12/181,437

(22) Filed: Jul. 29, 2008

(65) Prior Publication Data
US 2010/0030653 A1  Feb. 4, 2010

(51) Int. Cl.
*G06Q 30/00* (2012.01)
(52) U.S. Cl.
USPC .......................................................... 705/26.1
(58) Field of Classification Search .................. None
See application file for complete search history.

(56) References Cited

U.S. PATENT DOCUMENTS

| | | | |
|---|---|---|---|
| 6,058,373 A | | 5/2000 | Blinn et al. |
| 7,318,043 B1* | | 1/2008 | Silver et al. ............... 705/26.81 |
| 7,424,448 B2* | | 9/2008 | Fuchs et al. ................. 705/26.8 |
| 2002/0099649 A1* | | 7/2002 | Lee et al. ........................ 705/38 |
| 2002/0194074 A1* | | 12/2002 | Jacobs ............................ 705/16 |
| 2003/0037034 A1* | | 2/2003 | Daniels et al. .................... 707/1 |
| 2003/0210260 A1* | | 11/2003 | Palmer et al. ................. 345/715 |
| 2006/0139670 A1* | | 6/2006 | Hoblit ......................... 358/1.12 |
| 2006/0277103 A1* | | 12/2006 | Fujita et al. ..................... 705/14 |
| 2007/0174082 A1* | | 7/2007 | Singh ............................... 705/1 |
| 2007/0226067 A1* | | 9/2007 | Fuchs et al. ..................... 705/26 |
| 2008/0052171 A1* | | 2/2008 | Eldering ......................... 705/14 |
| 2008/0215453 A1* | | 9/2008 | Yoshii ............................. 705/26 |
| 2008/0306772 A1* | | 12/2008 | Shahrokh .......................... 705/3 |
| 2009/0037299 A1* | | 2/2009 | Powell et al. ................... 705/28 |

* cited by examiner

*Primary Examiner* — Ryan Zeender
*Assistant Examiner* — Kristie A Mahone
(74) *Attorney, Agent, or Firm* — Greenberg Traurig, LLP (57) ABSTRACT

Prior ordering history of a product is examined to determine an historical ordering quantity distribution for a product. A customer specified, to-be-purchased quantity of a product is then compared against the determined historical ordering-quantity frequency distribution for the product. When the customer specified, to-be-purchased quantity of the product falls below a certain probability threshold determined using the historical ordering-quantity frequency distribution, or is otherwise suspicious, the customer is notified of a suspected error in the provided product order quantity and/or asked to verify if the provided product quantity is correct.

11 Claims, 7 Drawing Sheets

TABLE FOR A GIVEN CUSTOMER

| VENDOR PRODUCT IDENTIFIER | ORDERING QUANTITY | FREQUENCY |
|---|---|---|
| 1A123 | 1 | 4 |
| 1A123 | 2 | 1 |
| 1A123 | ... | ... |
| 1A123 | 10,000 | 0 |
| 2P100 | 1 | 2 |
| 2P100 | 2 | 15 |
| 2P100 | ... | ... |
| 2P100 | 10,000 | 0 |
| ... | ... | ... |

FIGURE 3

TABLE FOR ONE OF MANY COMMUNITIES FOR A GIVEN CUSTOMER

| VENDOR PRODUCT IDENTIFIER | ORDERING QUANTITY | FREQUENCY |
|---|---|---|
| 1A123 | 1 | 201 |
| 1A123 | 2 | 65 |
| 1A123 | ... | ... |
| 1A123 | 10,000 | 0 |
| 2P100 | 1 | 19 |
| 2P100 | 2 | 278 |
| 2P100 | ... | ... |
| 2P100 | 10,000 | 0 |
| ... | ... | ... |

FIGURE 4

TABLE FOR ALL CUSTOMERS

| VENDOR PRODUCT IDENTIFIER | ORDERING QUANTITY | FREQUENCY |
|---|---|---|
| 1A123 | 1 | 450 |
| 1A123 | 2 | 202 |
| 1A123 | ... | ... |
| 1A123 | 10,000 | 0 |
| 2P100 | 1 | 51 |
| 2P100 | 2 | 430 |
| 2P100 | ... | ... |
| 2P100 | 10,000 | 0 |
| ... | | ... |

GRAINGER.

SUMMARY OF PROPOSED ORDER

Date: February 14, 2008

Invoice #: 3873392

PO: 334-A-299

Bill To: John Q. Smith
123 Elm Street
Anytown, USA 02134

Ship To: John Q. Smith
P.O. 350
Boston, MA 02134

| QTY | SKU | DESCRIPTION | EACH | TOTAL |
|---|---|---|---|---|
| 1 | 5FG45 | Filter, Cartridge, ½" | $ 3.00 | $ 3.00 |
| 12 | 2RT22 | Coffee Filters | $ 8.00 | $ 96.00 |
| *49 | 3J111 | Gloves, Cotton, XL | $ 2.00 | $ 98.00 |

SYSTEM AND METHOD FOR DETECTING A POSSIBLE ERROR IN A CUSTOMER PROVIDED PRODUCT ORDER QUANTITY

BACKGROUND

Currently, e-commerce websites operated by wholesalers, whether business to business (B2B) or business to consumer (B2C), provide many methods for a customer to navigate a website, view products, and purchase products. In connection with the purchasing of a product, the consumer is typically required to specify to the wholesaler a quantity of the product that the consumer desires to purchase. The consumer often specifies a desired product quantity by completing an order entry form, sometimes referred to as a "shopping cart" webpage. As illustrated in prior art FIG. 1, taken from U.S. Pat. No. 6,058,373, a typical "shopping cart" webpage generally provides a field, e.g., "QTY," into which the consumer types or otherwise enters a number that indicates to the wholesaler the quantity of a particular product that the consumer desires to purchase where each product to-be-purchased is generally identified to the consumer by using information, such as a product code or "sku," item description, etc., that is also provided within the "shopping cart" webpage. The "shopping cart" webpage may also be caused to dynamically update any total cost field(s) presented within the "shopping cart" webpage as a function of product quantities specified by the consumer.

SUMMARY

The following describes a system and method for detecting a possible error in a customer specified product order quantity during the product ordering process. Generally, the system and method functions by examining the prior ordering history of a product to determine an historical ordering quantity frequency distribution for the product. Historical ordering quantity frequency distributions may be determined for one or more of an individual customer, a homogenous subgroup of customers that includes the individual customer, and all customers. During the process in which a customer orders the product, but before the product order is actually placed with a wholesaler, the system compares a customer specified, to-be-purchased quantity of a product against one or more of the determined historical ordering-quantity frequency distributions for the product. If, based upon this comparison, it is determined that the customer specified, to-be-purchased quantity of the product falls below a certain predetermined threshold, or is otherwise suspicious, the customer is notified of a suspected error and/or asked to verify if the provided product quantity is correct.

A better understanding of the objects, advantages, features, properties and relationships of the system and method described hereinafter will be obtained from the following detailed description and accompanying drawings which set forth illustrative embodiments.

BRIEF DESCRIPTION OF THE DRAWINGS

For a better understanding of the system and method for detecting a possible error in a customer provided product order quantity, reference may be had to preferred embodiments shown in the following drawings in which.

DETAILED DESCRIPTION

Figure 1:
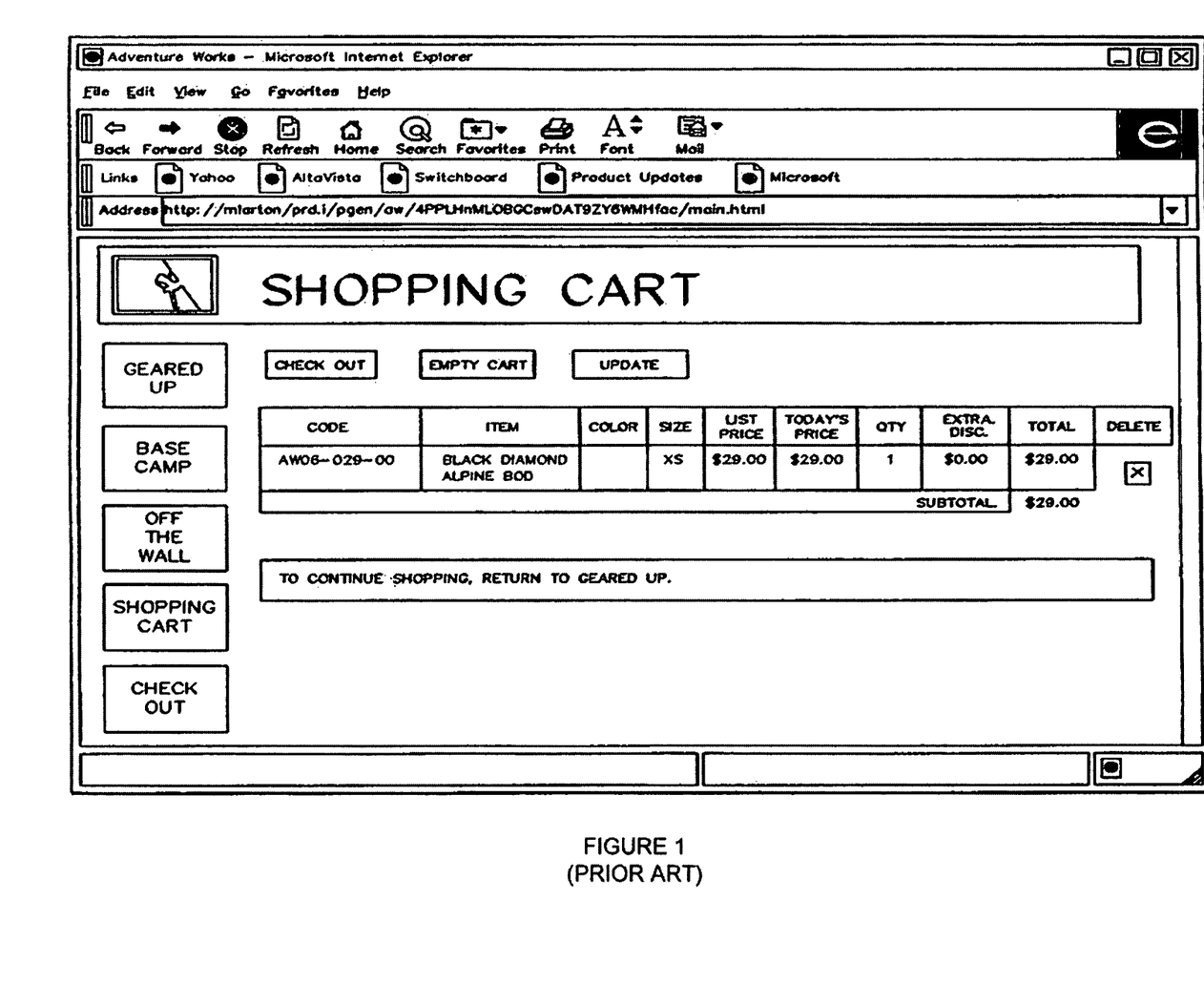
FIG. 1 illustrates an exemplary, prior art, product ordering form.
Figure 2:
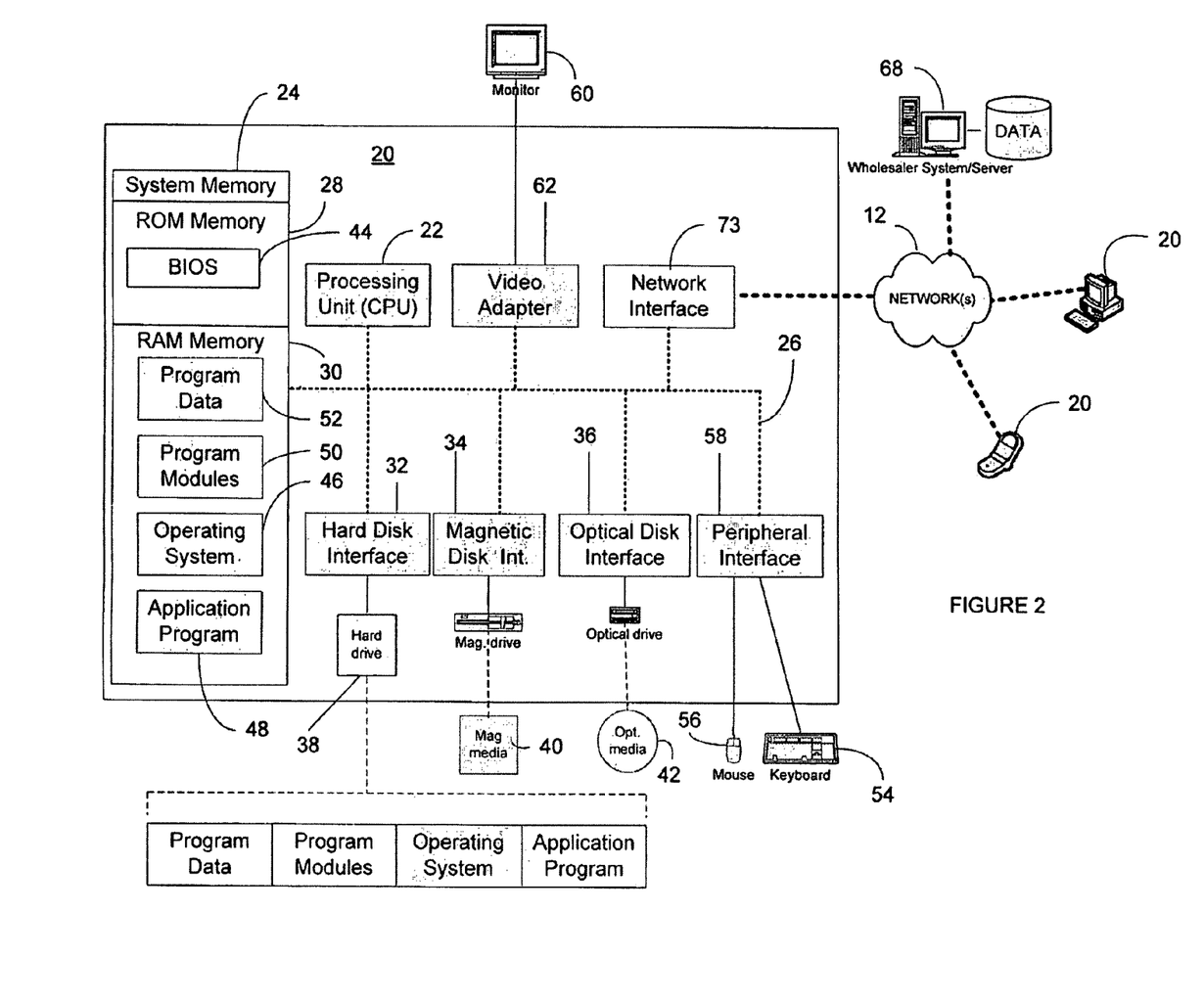
FIG. 2 illustrates a block diagram of an exemplary system in which the inventive concepts of the subject invention may be employed.

Turning to the drawings an exemplary system and method for detecting a possible error in a customer provided product order quantity is now described. As illustrated in FIG. 1, an exemplary system in which the subject inventive concepts may be employed includes a processing device 20, illustrated in detail by way of example only as a computer system, that is provided with executable instructions to, for example, provide a means for a customer to access a website, via a computer system/server 68, and thereby browse webpages and goods/services offered for sale by a wholesaler, retailer, vender, etc., (collectively "wholesaler") and access electronic commerce related functionality such as, but not limited to, functionality associated with ordering products of interest. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant (PDA), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more multiple processing devices.

For performing the various tasks in accordance with the executable instructions, a processing device 20 may include a processing unit 22 and a system memory 24 which may be linked via a bus 26. Without limitation, the bus 26 may be a memory bus, a peripheral bus, and/or a local bus using any of a variety of well known bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules, i.e., computer executable instructions, may be stored in one or more of the memory/media devices of the processing device 20. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to the processing device 20 as needed, for example, via a network connection.

The customer may enter commands and information into the processing device 20 through input devices such as a keyboard 54 and/or a pointing device 56. While not illustrated, other input devices may include a microphone, a joystick, a game pad, a scanner, etc. These and other input/output devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As further illustrated in FIG. 1, the processing device 20 may also utilize logical connections to one or more remote processing devices, such as the wholesaler system/server 68. The remote processing devices may have an associated data repository in which is stored data such as customer/company information, electronic catalog pages, an order entry page, etc. While the remote processing device 68 has been illustrated in the exemplary form of a server computer supporting conventional e-commerce type functionality, e.g., category drill down searching, parametric searching, key word searching, cross reference searching, accessing sales and promotional fliers, product ordering, viewing personal order histories, etc, it will be appreciated that the remote processing devices 68 may be any type of device having processing capabilities. As such, it will again be appreciated that the remote processing device 68 need not be implemented as a single device but may be implemented in a manner such that the tasks performed by the remote processing device 68 are distributed to a plurality of processing devices linked through a communication network For performing tasks as needed, the remote processing device 68 may include many or all of the elements described above relative to the processing device 20. Communications between the processing device 20 and the remote processing device 68 may be exchanged via a further processing device, such a network router, that is responsible for network routing. Communications with the network router may be performed via a network interface component 73. Thus, within such a networked environment 12, e.g., the Internet, World Wide Web, LAN, or other like type of wired or wireless network, it will be appreciated that program modules depicted relative to the processing device 20, or portions thereof, may be stored in the memory storage device(s) of one or more processing devices in communication therewith.

As noted above, a customer generally interacts with wholesaler system/server 68 to browse an electronic catalog of goods offered for sale by the wholesaler, to order/purchase goods of interest, to request delivery of such goods, etc. To ensure that the customer actually purchases a desired amount of product, i.e., the customer is not ordering a product in a quantity that is the result of a typographical error made during the order entry process, the system and method additionally functions to examine the customer provided product order quantity for the purpose of determining if the order quantity appears to be normal or if the order quantity appears to be likely in error. To this end, as illustrated by way of example only in FIG. 6, the system generally compares a customer specified, to-be-purchased quantity of a product against one or more determined historical ordering-quantity frequency distributions for the product. If, based upon this comparison, it is determined that the customer specified, to-be-purchased quantity of the product falls below a certain determined threshold, or is otherwise suspicious, the customer may be notified of a suspected error in the provided order quantity and/or asked to verify if the provided product quantity is correct.

Figure 3:
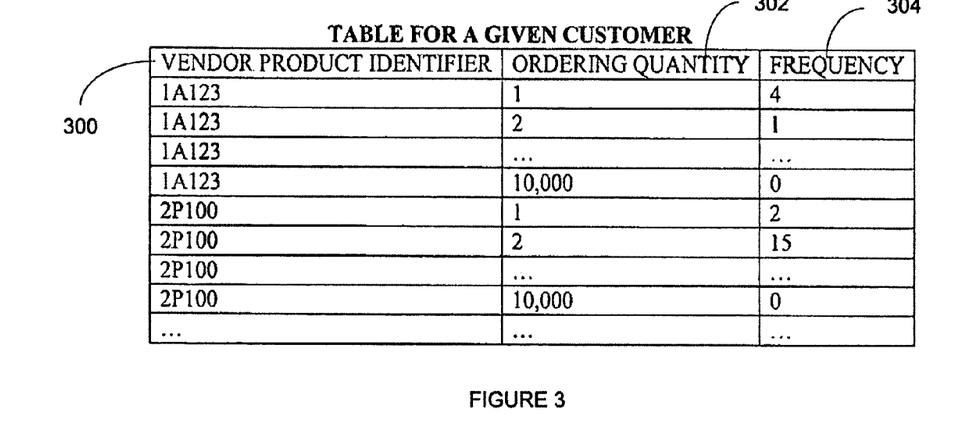
FIGS. 3-5 illustrate exemplary triplet data sets or historical ordering-quantity frequency distributions that are utilized in determining if a possible error in a customer provided product order quantity exists.
Figure 4:
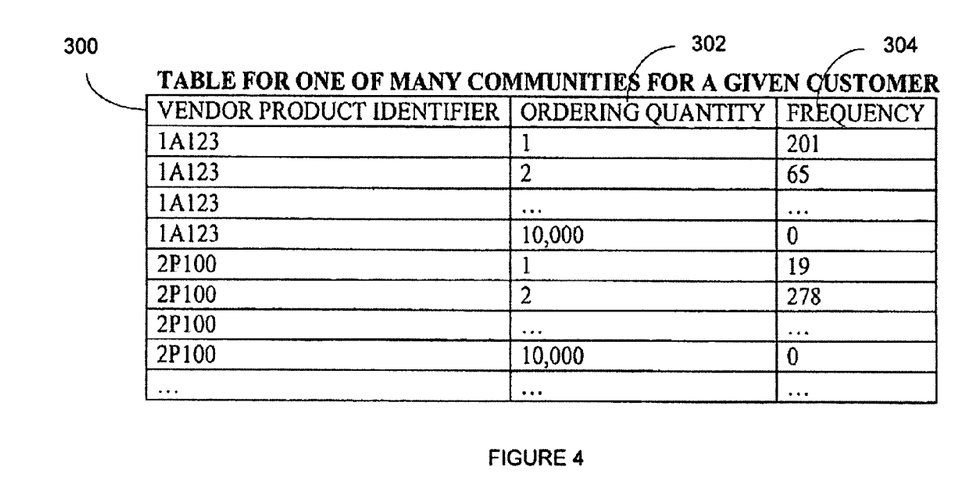

To determine historical ordering quantity frequency distributions for a product, the system considers prior purchasing behaviors of one or more of an individual customer, a subset or homogenous subgroup (i.e., a group of customers having one or more traits in common such as vocation, geography, etc.) of customers, and all customers. More particularly, with reference to FIGS. 3-5, from the information extracted from prior order histories of customers of the wholesaler a product order frequency distribution table may be created that has a series of value triplets. In the illustrated examples, each triplet consists of a product identifier 300 (e.g., a wholesaler sku for the product), an ordering quantity of the product 302, and a frequency 304 with which the corresponding ordering quantity of the product 302 in the triplet was actually ordered as reflected in the prior purchasing history data. The prior purchasing history data considered to determine the frequency with which a given product was purchased in a given quantity can be over any desired period of time. For completeness, a predetermined number of rows may be created in the triplets table for all possible theoretical ordering quantities of a product—in the example quantities ranging from 1 to 10,000 have been used. Thus, in the examples provided, FIG. 3 shows that the product represented by sku "1A123" was previously purchased from the wholesaler by a given customer (over a given period of time) in a quantity of 1 4 times, in a quantity of 2 1 time, in a quantity of 10,000 0 times, the product represented by sku "2P100" was previously purchased from the wholesaler by the given customer (over a given period of time) in a quantity of 1 2 times, in a quantity of 2 15 times, in a quantity of 10,000 0 times, etc.; FIG. 4 shows that the product represented by sku "1A123" was previously purchased from the wholesaler by a community that includes the given customer (e.g., a group sharing one or more characteristics with the given customer over a given period of time) in a quantity of 1 201 times, in a quantity of 2 65 times, in a quantity of 10,000 0 times, the product represented by sku "2P100" was previously purchased from the wholesaler by the given customer (e.g., a group sharing one or more characteristics with the given customer over a given period of time) in a quantity of 1

Figure 5:
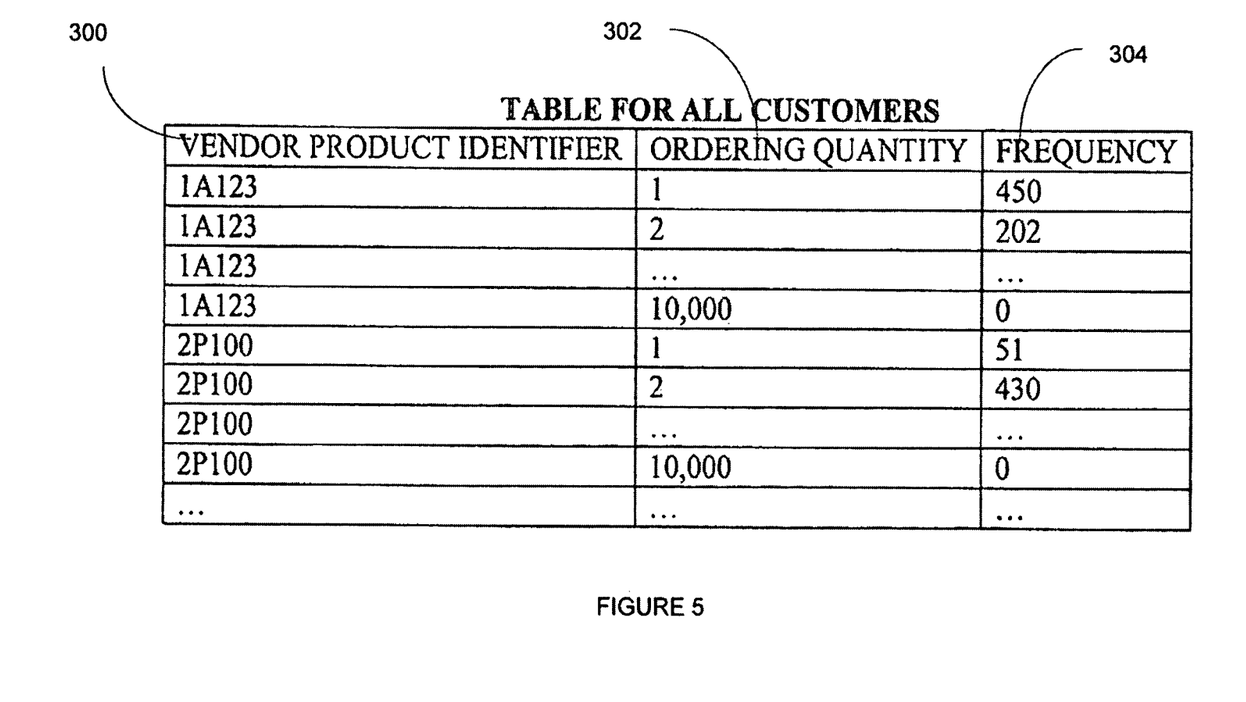

19 times, in a quantity of 2 278 times, in a quantity of 10,000 zero times, etc.; and FIG. 5 shows that the product represented by sku "1A123" was previously purchased from the wholesaler by a all customers (over a given period of time) in a quantity of 1 450 times, in a quantity of 2 202 times, in a quantity of 10,000 0 times, the product represented by sku "2P100" was previously purchased from the wholesaler by all customers (over a given period of time) in a quantity of 1 51 times, in a quantity of 2 430 times, in a quantity of 10,000 0 times, etc. These frequency distribution tables or triplets, which will be utilized in a manner described hereinafter, may be created during the ordering process or at a time prior to the ordering process without limitation.

Figure 8:
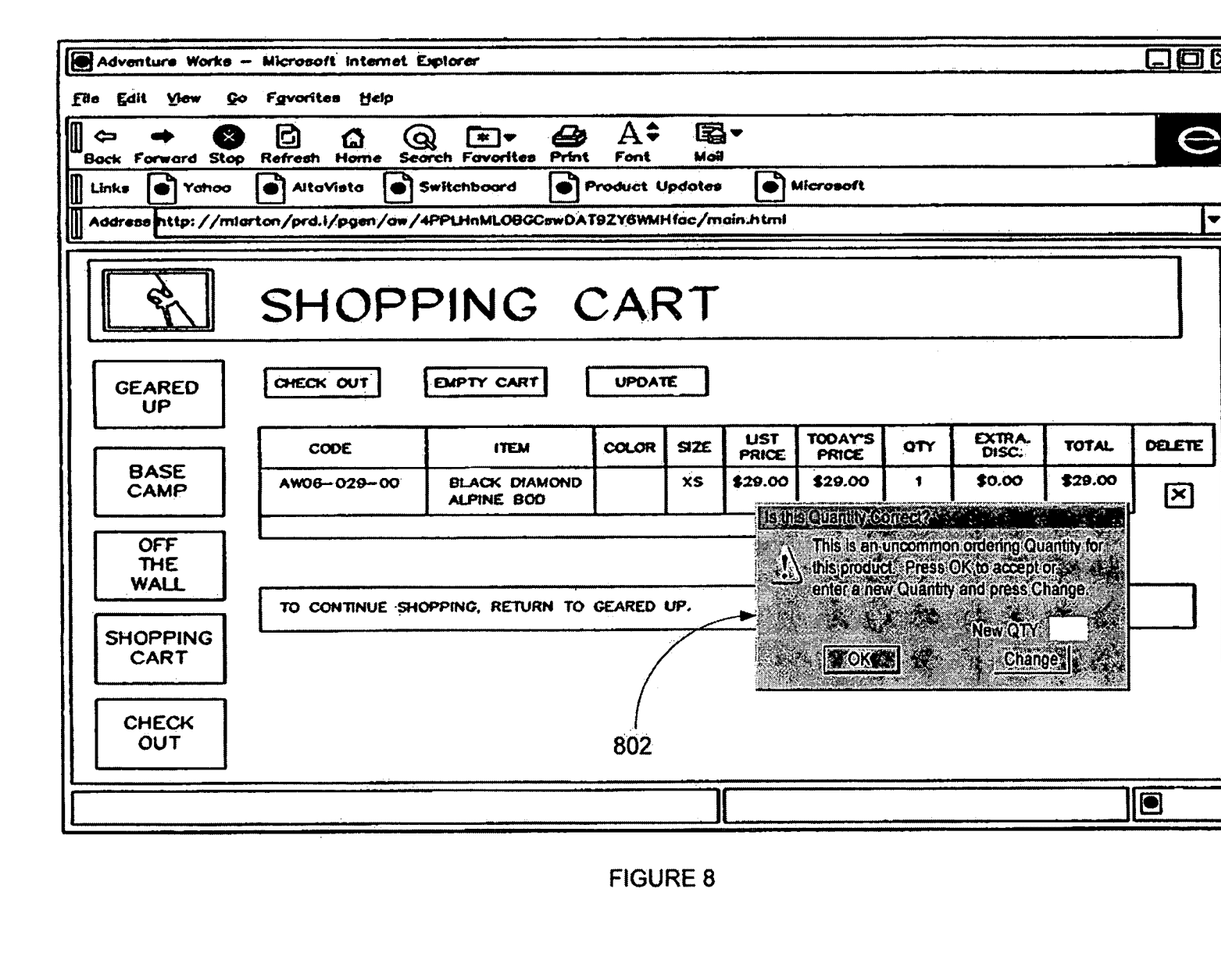
FIG. 8 illustrates an exemplary webpage and pop-up showing an exemplary manner in which a customer may be notified of a possible error in a provided product order quantity.

Considering now the ordering process, as a customer interacts with the server system 68 to specify to the wholesaler one or more products the customer desires to order as well as corresponding product quantities, for example via use of and interaction with the webpage "shopping cart," an example of which in illustrated in prior art FIG. 1, comparisons can be performed between a quantity entered by the customer for a given product and the prior, actual quantity ordering frequencies 304 for that product as contained within the various triplet tables. In this manner, if the ordering quantity provided for a given product varies beyond a certain threshold, a message 802 can be presented to the customer that functions to inform the customer of a possible order quantity error. The customer can bypass the message and leave the ordering quantity as is, or correct the value as illustrated in FIG. 8.

Figure 6:
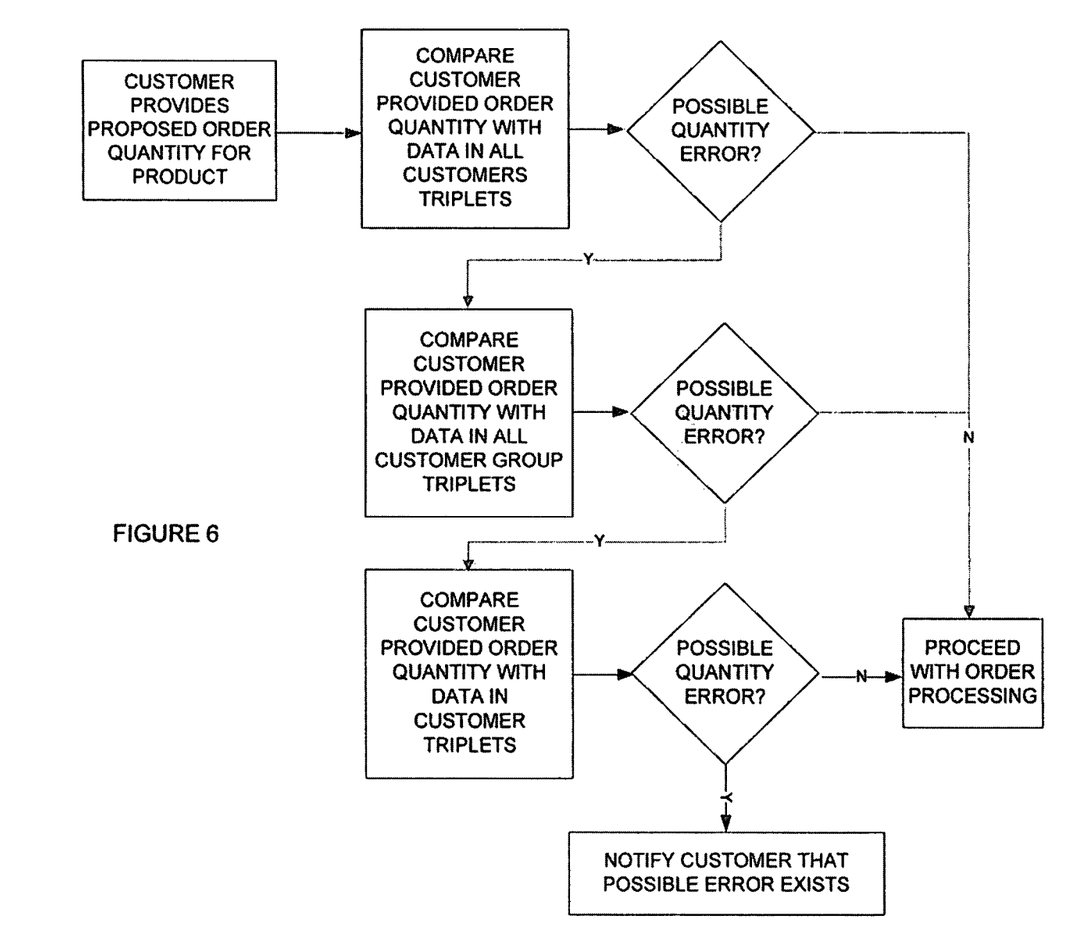
FIG. 6 illustrates a flow chart diagram of an exemplary method for determining if a possible error in a customer provided product order quantity exists.

By way of example, again with reference to FIG. 6, if a recognized customer, e.g., a customer that has logged-into the system 68, is recognized by means of a cookie, etc, specifies 49 pairs of cotton gloves (sku number 3J111) within their order, the system would look in one or more of the triplet tables to determine the frequency with which this customer, this customer's homogenous group, and/or all customers actually ordered 49 pairs of these cotton gloves—sku 3J111. If it turns out that the frequency with which customers have in the past actually ordered 49 pairs of gloves is below a certain threshold, then the customer would be alerted of the possible order quantity error as noted above. In this example, because 49 pairs of gloves was determined by the system to be an ordering quantity anomaly, i.e., none of all customers, a homogeneous group of customers, or the customer has ever ordered 49 pairs of gloves a statistically relevant number of times in the past, the customer is alerted to this fact and, as a result, the customer may, for example, realize that the customer tapped the "4" and the "9" key for 49 when the customer actually wanted to order a quantity value of 48. It is to be appreciated that, while FIG. 6 illustrates a particular order in which the data in the triplets tables is utilized to determine if a possible error exists in the order entry, the illustrated order of steps can be changed without departing from the scope and spirit of the invention. Similarly, while FIG. 6 illustrates the data in each triplet table being utilized to determine if a possible error exists in the order entry, less than each triplet table can be utilized in the process without departing from the scope and spirit of the invention. For example, if an unknown or first time customer access the system 68, the system 68 may only consider the data in the triplet table for all previous customers when determining if a possible error exists in a specified order quantity as the system would not have and/or be able to access any relevant data for a particular customer or a particular customer's homogeneous group in this instance.

When determining if a provided order quantity falls below a certain threshold conventional statistical processing may be utilized. For example, if a customer provided order quantity is a quantity 302 with a frequency 304 within a triplet table that falls outside of a calculated standard deviation of the product quantity ordering frequencies within that triplet table, this may be used by the system to indicate a possible error. The threshold can also be determined using a simple percentage. For example, if the quantity provided by a customer is used less than 2% of the time when ordering a given product—considering the order frequency data within the triplet—then this may signify to the system that a possible error exists and the system may accordingly ask the customer to verify the provided quantity as shown in FIG. 8. Accordingly, it will be appreciated by those of ordinary skill in the art that numerous means for using the frequency data within the triplet tables to determine a threshold against which to compare a customer entered order quantity exists and, as such, the invention is not intended to be limited to the specific examples provided.

Figure 7:
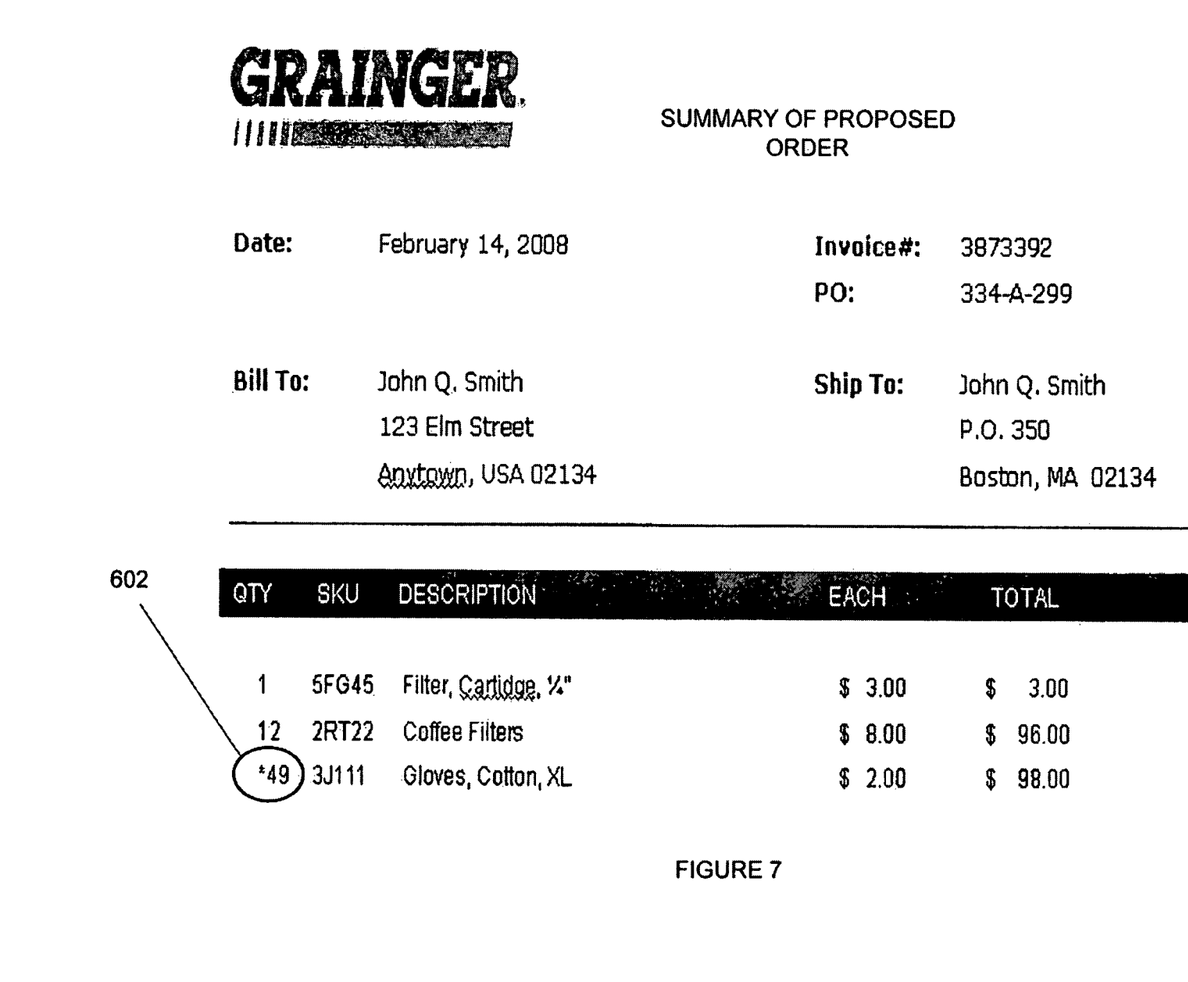
FIG. 7 illustrates an exemplary webpage showing an exemplary manner in which a customer may be notified of a possible error in a provided product order quantity.

While explained in the context of providing a warning to the customer during the "shopping cart" completion phase of the purchasing process, it is to be appreciated that the same functionality can be provided during the order completion phase where an "order form summary" is presented which summarizes the entire order, such as shown in FIG. 7. In this case, an indicator 602 can be placed next to any items which have a "suspicious" quantity value with the customer then having the option to correct, if desired, the proposed order quantity before the order is acted upon by the wholesaler. The notification could also be a voice or sound prompt that is caused to be presented to the customer without limitation.

As will be further understood, the triplet tables used in this process can be updated on a regular basis and include all prior customer orders, or any subset of prior customer orders, considered over any period of time that makes sense. For example, quantities of products ordered might change for seasonal products and, as such, triplet tables covering relevant seasonal months for customers (possibly considering geographic locations of customers as a community for a triplet table) may be created, e.g., customers in the northern U.S. states may have different ordering quantity distributions for salt during winter months as compared to the spring months or fall months and different ordering quantity distributions for salt as compared to customers in the southern U.S. states.

It will also be appreciated that, as yet another way to decrease the chances that a customer makes an error entering a quantity value, the input area for quantity in the "shopping cart" can be pre-populated with a quantity or quantities that a distribution triplet table (for the customer, customer community, and/or all customers) indicates is a statistically significant reoccurring order quantity. A drop down selection box may be utilized when presenting multiple predetermined ordering quantities to the customer. Alternatively, links, or the like, which represent the most common ordering quantities, for this customer or for any group to which the given custom belongs, can be placed next to or near the input box for quantity. In this way, the customer need only click on a desired link to populate the quantity field instead of free-form typing the value therein.

While specific embodiments of the invention have been described in detail, it will be appreciated by those skilled in the art that various modifications and alternatives to those details could be developed in light of the overall teachings of the disclosure. For example, another way to detect suspicious customer entered quantities is to compare a customer entered quantity against data within a table of error quantities that are known to have occurred in the past, e.g., the table would include data that reflects instances where customers have contacted the wholesaler to report past product ordering quantity errors whereby any customer provided product order quantity that has a corresponding entry within the table could be flagged as being provided in possible error. Likewise, a customer entered quantity can be compared against data in a table that reflects order quantities that would be anticipated to be suspicious, e.g., the table would include quantities that, if specified by a customer, would be the logical result of a typographical error—such as entered orders having keyboard numbers that logically surround commonly seen order quantities, entered orders having numbers that would be the logical result of having keystrokes repeated in error, etc.—whereby any customer provided product order quantity that has a corresponding entry within the table could be flagged as being provided in possible error. Accordingly, the particular arrangements disclosed are meant to be illustrative only and not limiting as to the scope of the invention which is to be given the full breadth of the appended claims and any equivalents thereof.

What is claimed is:

1. A non-transitory computer-readable media having computer readable instructions stored thereon that, when executed by a processor, cause the processor to perform steps comprising:

causing an order form webpage to be presented on a client computer system in communication with an e-commerce server system, the order form webpage having information representative of a product desired to be purchased from a wholesaler and a customer-entry field in which is specified a quantity of the product desired to be purchased;

using data contained within an historical order frequency distribution table for the product to determine if the specified quantity of the product has been ordered in the past in a frequency that is less than a predetermined number of times; and when it is determined that the specified quantity of the product has been ordered in the past in a frequency that is less than a predetermined number of times providing a notification to the consumer at the client computing device that the specified quantity of the product is suspected to be in error.

2. The non-transitory computer-readable media as recited in claim 1, comprising providing with the notification a further customer-entry field in which the quantity of the product desired to be purchased is to be changed.

3. The non-transitory computer-readable media as recited in claim 2, wherein the notification comprises a webpage pop-up.

4. The non-transitory computer-readable media as recited in claim 1, wherein the instructions populate an historical order frequency distribution table by causing data indicative of a product quantity to be stored in a first data field of a data triplet and data indicative of a number of times the product quantity indicated by the data in the first data field was actually purchased in that quantity in the past from the wholesaler to be stored in a second data field of the data triplet.

5. The non-transitory computer-readable media as recited in claim 4, wherein the instructions cause data indicative of a number of times the product quantity indicated by the data in the first data field was actually purchased in that quantity in the past from the wholesaler by all customers of the wholesaler to be stored in the second data field of the data triplet.

6. The non-transitory computer-readable media as recited in claim 4, wherein the instructions cause data indicative of a number of times the product quantity indicated by the data in the first data field was actually purchased in that quantity in the past from the wholesaler by the customer to be stored in the second data field of the data triplet.

7. The non-transitory computer-readable media as recited in claim 4, wherein the instructions cause data indicative of a number of times the product quantity indicated by the data in the first data field was actually purchased in that quantity in the past from the wholesaler by a homogeneous group of customers of the wholesaler which includes the customer to be stored in the second data field of the data triplet.

8. The non-transitory computer-readable media as recited in claim 1, wherein the notification comprises a sound prompt.

9. The non-transitory computer-readable media as recited in claim 8, wherein the sound prompt comprises a voice.

10. The non-transitory computer-readable media as recited in claim 4, wherein the instructions cause data indicative of a number of times the product quantity indicated by the data in the first data field was actually purchased in that quantity in the past from the wholesaler over a predetermined, period of time to be stored in the second data field of the data triplet.

11. The non-transitory computer-readable media as recited in claim 10, wherein the predetermined period of time is a seasonal period.

* * * * *